(12) United States Patent  (10) Patent No.: US 8,654,434 B2
Cohen et al.  (45) Date of Patent: Feb. 18, 2014

(54) WSS WITH PIXEL GAP COMPENSATION

(75) Inventors: Gil Cohen, Livingston, NJ (US); Yossi Corem, Beit Shemesh (IL); Roey Harel, New Providence, NJ (US)

(73) Assignee: Oclaro (New Jersey), Inc., Denville, NJ (US)

( * ) Notice: Subject to any disclaimer, the term of this patent is extended or adjusted under 35 U.S.C. 154(b) by 66 days.

(21) Appl. No.: 13/187,038

(22) Filed: Jul. 20, 2011

(65) Prior Publication Data

US 2012/0019893 A1  Jan. 26, 2012

Related U.S. Application Data

(60) Provisional application No. 61/344,419, filed on Jul. 20, 2010.

(51) Int. Cl.
  *G02B 26/00* (2006.01)
  *G02B 26/12* (2006.01)

(52) U.S. Cl.
  USPC ........ 359/291; 359/290; 359/298; 359/212.1; 359/224.1

(58) Field of Classification Search
  USPC .......... 359/290–295, 298, 839, 212.1, 212.2, 359/213.1, 214.1, 223.1, 224.1, 224.2, 359/225.1, 226.1; 385/15–19; 353/31; 349/5, 179; 398/81
  See application file for complete search history.

(56) References Cited

U.S. PATENT DOCUMENTS

| | | | | |
|---|---|---|---|---|
| 5,661,591 A * | 8/1997 | Lin et al. | ........................ | 359/290 |
| 5,835,293 A * | 11/1998 | Min et al. | ...................... | 359/850 |
| 6,456,419 B1 * | 9/2002 | Winker et al. | ................ | 359/279 |
| 6,635,919 B1 * | 10/2003 | Melendez et al. | ............ | 257/312 |
| 6,707,594 B2 * | 3/2004 | Holmes | ......................... | 359/291 |
| 6,798,561 B2 * | 9/2004 | Huibers | ........................ | 359/291 |
| 7,027,207 B2 * | 4/2006 | Huibers | ........................ | 359/291 |
| 7,167,613 B2 * | 1/2007 | Miller et al. | .................... | 385/18 |
| 7,330,616 B2 * | 2/2008 | Yamamoto et al. | ............. | 385/18 |
| 7,403,324 B2 * | 7/2008 | Huibers | ........................ | 359/291 |
| 7,903,318 B2 * | 3/2011 | Moidu et al. | .................. | 359/291 |
| 8,260,139 B2 * | 9/2012 | Suzuki et al. | ................... | 398/81 |
| 2002/0109903 A1 | 8/2002 | Kaeriyama | | |
| 2004/0258351 A1 | 12/2004 | Ducellier et al. | | |
| 2005/0001176 A1 | 1/2005 | Loney et al. | | |
| 2005/0180685 A1 | 8/2005 | Miller et al. | | |
| 2007/0285761 A1 | 12/2007 | Zhong et al. | | |
| 2008/0316585 A1 | 12/2008 | Cohen et al. | | |
| 2009/0190202 A1 | 7/2009 | Moidu et al. | | |

FOREIGN PATENT DOCUMENTS

WO  WO 2007/029260 A2  3/2007

OTHER PUBLICATIONS

PCT/US2011/044760 International Search Report (Nov. 7, 2011).

* cited by examiner

*Primary Examiner* — Loha Ben
(74) *Attorney, Agent, or Firm* — Fenwick & West LLP

(57) ABSTRACT

An optical device compensates for decreased transmission of light caused by gaps between mirrors of a MEMS array. The optical device employs MEMS mirrors having non-reflecting regions on them disposed such that reflecting regions of the MEMS mirrors have substantially the same optical throughput, or an additional optical element having increased transmission at those spatial positions where light impinging on the gaps passes through. Alternatively, the optical device may employ a filter having spectral transmission characteristic with increased transmission at those wavelengths of dispersed light that impinge on the gaps.

15 Claims, 6 Drawing Sheets

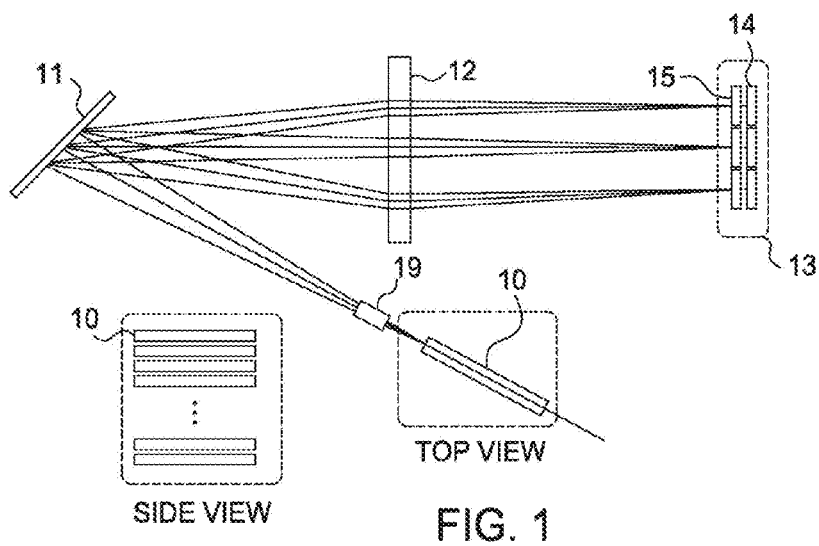
FIG. 1
(PRIOR ART)
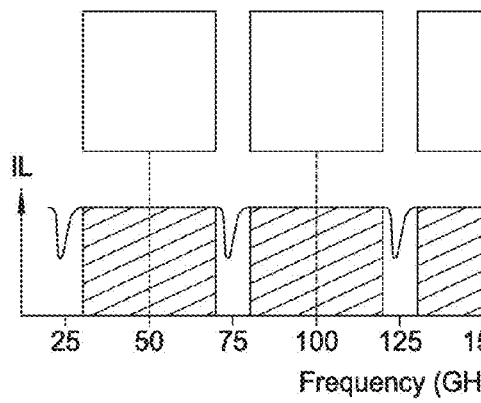
FIG. 2A
FIG. 2B
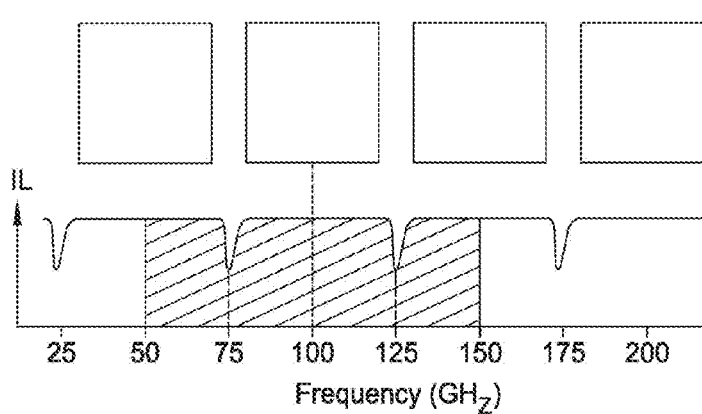
FIG. 3A
FIG. 3B

WSS WITH PIXEL GAP COMPENSATION

CROSS-REFERENCE TO RELATED APPLICATIONS

This application claims benefit of U.S. provisional patent application Ser. No. 61/344,419, filed Jul. 20, 2010, which is herein incorporated by reference.

BACKGROUND OF THE INVENTION

1. Field of the Invention

The present invention relates to the field of arrays of pixelated optical beam handling elements, especially to the use of such arrays in wavelength selective switches for use in optical communication systems, to methods of reducing the effect of pixel gaps on the wavelength performance of such switches.

2. Description of the Related Art

There exists a class of optical wavelength selective switches (WSS hereinafter) which depend on the dispersion of the wavelength components of an input signal along an array of beam modifying pixels, followed by an array of beam steering pixels, such as an array of MEMS. An example of such a switch is shown in International Patent Application Publication No. WO2007/029260 for "Optical Wavelength Selective Router", having a common inventor with the present application. In this example, polarization rotation by a pixelated Liquid Crystal (LC) array is used to modify the beams. Reference is made to FIG. 1, which illustrates schematically a top view of such a prior art WSS structure. The polarization diversified input beams 19 are wavelength dispersed in the plane of the drawing, conveniently by means of a diffraction grating 11. The wavelength dispersed beams are focused by a lens 12 onto a one-dimensional beam steering and switching array 13. In the exemplary switch shown in FIG. 1, a MEMS array 14 is used for the beam steering, and a pixilated liquid crystal cell 15 for attenuation of the switched beams. For the sake of simplicity, only three separate wavelength channels and three pixels are shown in FIG. 1, though it is to be understood that using an International Telecommunication Union (ITU) grid spacing of 100 GHz or 50 GHz (or any other spacing that may be used in the future), the number of channels that will fit into the bandwidth of the device will be much larger. The MEMS array steers the signals destined for different output ports in a direction out of the plane of the drawing, i.e. in the direction of the height of the switch, such that output signals are differently directed to enter different fiber optical collimators 10 shown in the side view of the collimator stack.

In such switches, there exists a potential problem because of the finite gaps between adjacent mirror pixels. That part of an optical beam falling on an inter-pixel gap is not directed back to its intended destination port, such that the transmission characteristic of the beam shows a notch of increased insertion loss at such gaps. So long as the channel grid associated with the pixels is the same as that of the pixelated array, this presents no problem, since the light associated with each channel allows enough band pass without any drastic loss changes and no light of interest will fall on the gap. However situations may arise where flexibility is required of the network, and it is desired to select the spectral width of some channels to be different from the effective wavelength width of a pixel, such as to designate some channels as having a higher information capacity and hence needing to carry laser modulation at a higher frequency. In such a case, the spread wavelength of the channel may fall on more than one mirror, requiring operation of two adjacent mirrors in unison to switch the channel, and that part of the width of the channels falling on an inter-pixel gap, and hence that part of the information at the wavelengths falling on the gap will be lost, or at least severely attenuated.

Reference is now made to FIGS. 2A and 2B which illustrate this problem schematically. FIG. 2A shows an array of pixels, typically a pixelated array of MEMS mirrors, each pixel having a width and grid spacing such that it is just filled by the width of the wavelength dispersed incident light falling on the array. In the example shown in FIG. 2A, an array for use with an ITU grid of 50 GHz is shown. The 50 GHz wide optical information channels are shown properly aligned such that each channel falls on a single pixel of the mirror array, with the center of each channel at 50 GHz, 100 GHz, 150 GHz, 200 GHz., etc., centered on the center of the pixels.

In FIG. 2B, there is shown a schematic plot of the transmission characteristic of the pixel array shown in FIG. 2A, plotted as insertion loss IL as a function of wavelength. As is observed, at each of the gaps between pixels, there is a sharp increase in insertion loss, corresponding to a frequency grid of 75 GHz, 125 GHz, 175 GHz, etc. Also shown in FIG. 2B, as shaded regions, is the useful bandwidth of each channel centered on the ITU grid. As is observed, since all of the light of each channel falls within a pixel, none of the information is lost or degraded because of impingement on one of the transmission dips at the gaps.

Reference is now made to FIGS. 3A and 3B, in which there is shown the same pixel array as in FIG. 2A, but for use in a situation for transmitting an incident channel of width 100 GHz, as would be desired for transferring a higher information content in the channel. The wider channel is centered at the 100 GHz ITU grid point. In FIG. 3B, in the insertion loss plot, there is shown a shaded region, denoting the useful bandwidth of the 100 GHz. wide channel, centered on the 100 GHz. grid point. As is observed, since the 100 GHz channel bandwidth now covers more than one mirror, (three in this case), transmission dips resulting from the gaps in the mirror array at 75 GHz and 125 GHz now fall within the bandwidth of the channel. As a result of this, information at those points is lost, or seriously attenuated.

Although the insertion loss of a single traverse of such a MEMS array mirror by itself may not be large enough to result in serious loss of information from the channel, it should be evident that in a complex switching network, where the signal may pass through a number of nodes all of which lie on the same grid such that all of the gaps fall at exactly the same wavelength, the gap loss at each node will be cumulative. As a result, the depth of the loss spikes at the gaps will be multiplied by the number of nodes traversed by the signal, such that after several such traverses, the loss at each gap wavelength could be catastrophic to the information content of the channel. Reference is now made to FIGS. 3C and 3D which illustrate this effect. FIG. 3C shows a schematic plot of the insertion loss of the first channel of information shown in FIG. 3B showing a sharp increase in insertion loss at the gaps located at 75 GHz and 125 GHz, while FIG. 3D shows the multiplied loss characteristic from traverses through multiple nodes of the system.

One method of reducing the effect of the gaps is by constructing a MEMS array having much higher mechanical accuracy, such that the gap can be made much smaller. Thus, whereas 6μ is a typical gap size of a MEMS array for use in such switches in the optical communication bands, if the gap size could be reduced to 0.5μ, there would be little interference with information transfer. However, such a narrow gap would impose serious mechanical tolerance problems on the manufacture of the MEMS array, and even if produced, such an array may be prone to mechanical malfunction. This solution is therefore generally impractical.

There therefore exists a need for a method of reducing the effect of inter-pixel gaps, such that at least some of the disadvantages of such prior art WSS's and systems can be overcome.

It is to be understood that the limitations generated in optical communication systems because of the presence of the finite gaps between the mirrors of a pixelated MEMS array are not limited to LC controlled WSS's, as described hereinabove. Such WSS's using LC polarization rotation control are only one common example of the use of pixelated MEMS mirror arrays, and it is to be understood that the problem arises with any application where MEMS mirror arrays are utilized, whether one-dimensional or two-dimensional.

The disclosures of each of the publications mentioned in this section and in other sections of the specification, are hereby incorporated by reference, each in its entirety.

SUMMARY OF THE INVENTION

The present invention generally relates to an optical device that compensates for decreased transmission of light caused by gaps between mirrors of a MEMS array. In one aspect, an optical device is provided that includes an array of Micro Electro Mechanical System (MEMS) mirrors, successive ones of the MEMS mirrors having gaps between them, such that the MEMS array shows decreased optical throughput at positions of the gaps. The optical device further includes an optical element disposed in juxtaposition to the MEMS array, such that light impinging on the MEMS array also traverses the optical element, the optical element having a spatial transmission characteristic which shows increased transmission in at least some positions through which light impinging on the gaps passes, as compared to positions through which light impinging on the MEMS mirrors passes.

In another aspect, an optical device is provided that includes an array of Micro Electro Mechanical System (MEMS) mirrors, successive ones of the mirrors having gaps between them, wherein the mirrors have non-reflecting regions on them disposed such that the reflecting regions of said MEMS mirrors have substantially the same optical throughput.

In a further aspect, an optical device is provided that includes an array of Micro Electro Mechanical System (MEMS) mirrors receiving wavelength dispersed light from an input beam, successive ones of the MEMS mirrors having gaps between them, such that the MEMS array shows decreased optical throughput to the wavelengths of the input beam impinging on the gaps. The optical device also includes an optical element having a spectral transmission characteristic which shows increased transmission with for at least one wavelength of light impinging on one of the gaps, as compared to wavelengths of light impinging on the MEMS mirrors adjacent the gap.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 shows schematically a top view of a prior art WSS structure, using an LC polarization rotation element, and MEMS array beam steering;

FIG. 2A shows an array of pixels with the inter-pixel gaps, typically a pixelated array of MEMS, for use on a 50 GHz grid; FIG. 2B shows a schematic plot of the transmission characteristic of the pixel array shown in FIG. 2A;

FIGS. 3A and 3B show the same pixel array as in FIG. 2A, but with an incident channel of width 100 GHz, as would be desired for transferring a higher information content in the channel;

FIGS. 3C and 3B show the insertion loss of two channels of information shown in FIG. 3B for a single pass through the WSS, while

DETAILED DESCRIPTION

Figure 3C:
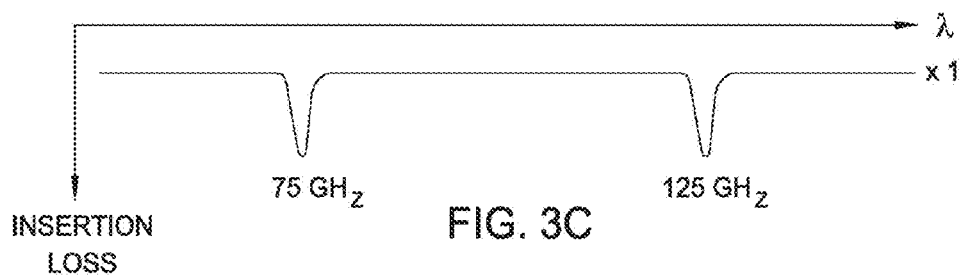
Figure 3D:
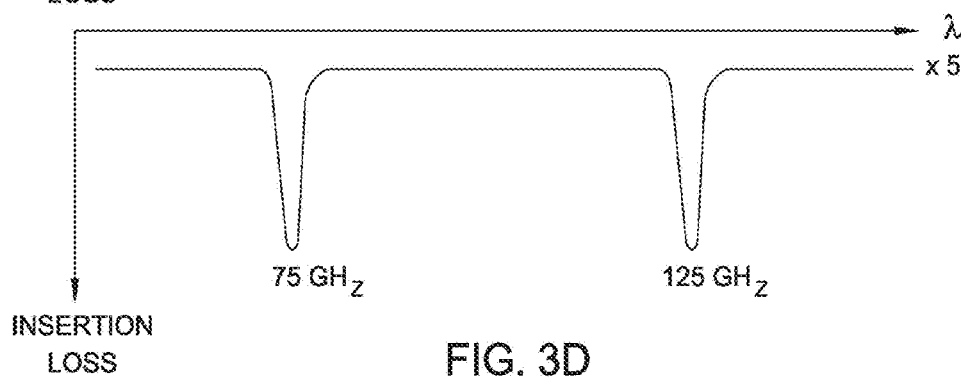
FIG. 3D shows the multiplied loss characteristic from traverses through multiple nodes of a system with such WSS's.

The present disclosure describes new exemplary systems for compensating for the decreased transmission in beam steering assemblies incorporating MEMS arrays, because of the finite gaps between mirrors of the array, at which reflection is impaired. A number of alternative implementations are given, in which an additional optical element is disposed in the system, the additional optical element having increased transmission in exactly those spatial positions where wavelength dispersed light impinging on the gaps would pass. The element is constructed such that the increased transmission covers a spatial extent and is of such a level that the impairment of the reflection in the mirror array arising from the gaps is compensated for as completely as possible.

According to one optional implementation, this additional optical element can incorporate small separately driven sub-pixels in a pixelated liquid crystal array used, for instance, to rotate the polarization orientation of light falling on the beam steering assembly and/or to attenuate that light, the sub-pixels being disposed in spatial positions corresponding to those of passage of light impinging on the gaps.

Other implementations of this additional optical element can be a neutral density filter, having regions of increased transmission located in line with the optical path through the gaps.

Further implementations include a filter having a spectral transmission characteristic which has increased transmission at those wavelengths of dispersed light corresponding to that of light impinging on the gaps. This filter, which is akin to the Gain Flattening Filters (GFF) known in the art, can be added in series to the optical system at the fiber level. In this respect, this solution differs from that of the previous solutions, which have to be applied close to the focal plane.

According to other alternative implementations, the MEMS mirrors themselves may have non-reflecting regions on them, such as slots or other shaped openings or masked non-reflecting regions, disposed such that the non-reflecting regions and the gaps are arranged spatially in cyclic periodic sequence. This arrangement of non reflecting regions, comprising the slots and the gaps essentially equally spaced, has a transmission characteristic having an overall insertion loss somewhat greater than that of clear mirrors due to the effect on the coupling of the Gaussian mode of the beam, but shows a considerably lower transmission modulation effect than that of unperturbed mirrors with just gaps between them, such that the effect on the transmission by the presence of the gap regions is reduced. It is not necessary that the non-reflecting regions on the mirrors and the mirror gaps be of the same dimensions and/or part of the same periodic sequence. However, if that is achieved, the compensation effect will be improved, in that the ripple will be more uniform, without any periodic dips of larger attenuation than the average level.

Although the methods and systems in this application will be mostly described directed to wavelength selective switches having a one-dimensional MEMS array operating on polarization rotated light using an LC array, this being a very common use of such MEMS arrays, it is to be understood that the invention is not meant to be limited to such applications, but is intended to be applicable, and may also be claimed, for solving the problem of non-finite gaps in MEMS arrays, whether one-dimensional or two-dimensional, and for any other optical switching application.

Furthermore, the configurations suggested herein of using a compensating optical element for an array of optical elements having gaps which disturb the optical function of the array elements, are also applicable for use in any other type of optical beam handling or manipulating arrays having gaps, such as arrays of transmissive LC elements, or LCOS arrays, or other such arrays.

To better understand the novelty of system of the present invention and the methods of use thereof, reference is hereafter made to the accompanying drawings.

Figure 4:
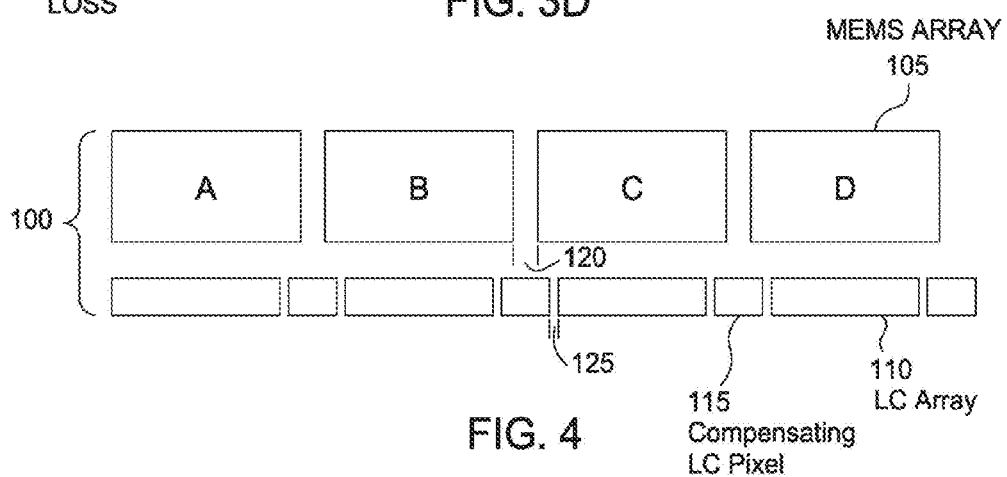
FIG. 4 illustrates schematically a beam switching array constructed according to a first exemplary implementation of the switching arrays of the present disclosure, using compensating sub-pixels.

FIG. 4 illustrates schematically a beam switching array 100 constructed according to a first exemplary implementation of the switching arrays of the present disclosure. The beam switching array 100 may be used in the WSS structure shown in FIG. 1. The beam switching array 100 includes a MEMS array 105, LC array 110 and a plurality of LC sub-pixels 115. In this example, the pixel width and spacing is suited to a 50 GHz grid. The MEMS array 105 has inter-pixel gaps 120. However, each switching pixel of the LC switching array 110 in front of the MEMS array 105 is made somewhat narrower than its corresponding MEMS pixel, leaving a larger gap. In that gap the LC sub-pixel 115 is disposed, such that it is located in front of the gap 120 of the MEMS array 105. The gaps 120 between the MEMS pixels of the MEMS array 105 are typically of the order of few microns, generally 5-10μ. Because of the different method of construction, a gap 125 between the pixels of the LC switching array 110 can be made smaller typically of the order of 2μ.

Figure 5:
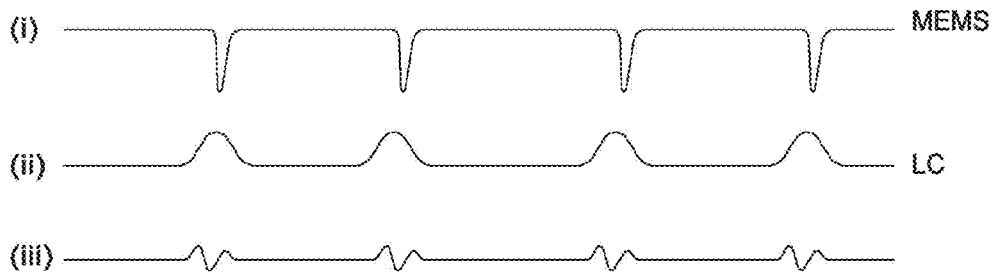
FIG. 5 shows the spectral transmission resulting from the component parts of the switching array of FIG. 4.

Each sub-pixel 115 has its own electrodes, such that it can be driven independently of the main pixels of the LC array 110. The drive voltage applied to these sub-pixels 115 is arranged such that there is minimum attenuation of the light passing through the sub-pixels 115 as compared to that passing through the main pixels of the LC array 110. By careful adjustment of the comparative drive voltages applied to the main pixels of the LC array 110 and to these sub-pixels 115, it is possible to compensate for the increased attenuation arising from the gaps 120 between the MEMS pixels of the MEMS array 105 by means of the increased transmissibility of the light passing through the sub-pixels 115 of the LC array 110. These sub-pixels 115 therefore act as compensation pixels to flatten out the overall spectral response of the switching array 100, thereby nullifying the effect of the MEMS pixel gaps 120. The extent to which the spectral response can be flattened is dependent on the extent to which such factors as the edge effects of the fields of the sub-pixels 115 can be correctly modeled. The sub-pixels 115 can all be driven together at the same voltage, independently of the different voltages applied to the main pixels of the LC array 110 as they attenuate the traversing light according to the channel needs, since their function is common—to compensate for the MEMS gap attenuation effect. The three traces of FIG. 5 show respectively:

(i) the insertion loss plot of the MEMS array across its width;

(ii) the spectral transmission plot along the LC array, and (iii) a spectral plot of the result of transmission after passage through both of these arrays.

The resulting transmission in trace (iii) is seen to be significantly flatter than that of the MEMS array alone, the flatness depending on how well the two transmission characteristics can be balanced against each other at the gap positions.

Since the light steered by the MEMS array 105 passes through the LC sub-pixels 115 twice, on its incident path to the mirrors, and on its reflected path from the mirrors, this double pass has to be taken into account when calculating the compensating effect of the LC sub-pixels 115 on the gap attenuation.

This arrangement may require more than a simple drive voltage control system, since as the attenuation of an LC channel is increased or decreased, the field applied to the adjacent compensation sub-pixels may need to be adjusted to track the attenuation in the neighboring main pixel.

Figure 6A:
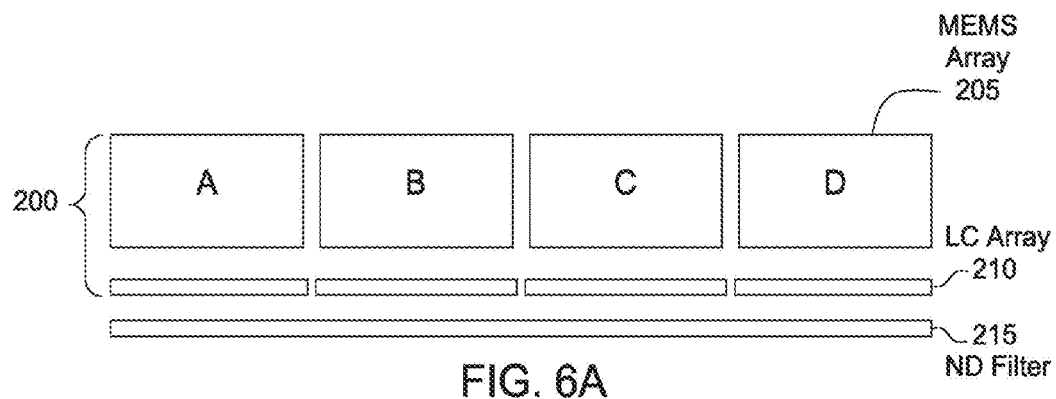
FIG. 6A illustrates a further method by which MEMS gap cancellation can be achieved, by the use of correction filters.

Reference is now made to FIG. 6A which illustrates a further method by which MEMS gap cancellation can be achieved. In FIG. 6A there is shown a beam switching array 200 that includes a MEMS array 205 and an LC array 210 (in the exemplary implementation shown where the WSS uses LC designation of the beams) co-aligned, as in the prior art. A neutral density (ND) filter 215 is disposed in juxtaposition to this beam switching array 200. The neutral density filter 215 and the beam switching array 200 may be used in the WSS structure shown in FIG. 1.

Figure 6B:
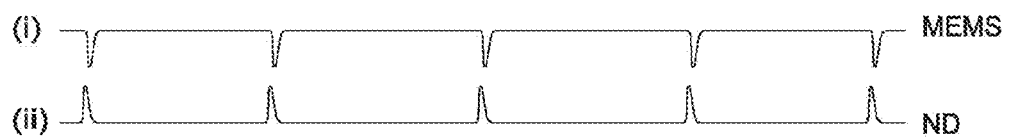
FIG. 6B shows the transmission resulting from its component parts.

The neutral density filter 215 has a spatial profile such that in the regions disposed optically collinearly with each MEMS gap, the transmissibility of the filter is higher than at regions not in line with a gap. The neutral density filter 215 is tailored such that the additional insertion loss of the MEMS gap, shown as trace (i) of FIG. 6B, is compensated for by the reduced insertion loss of the neutral density filter 215 shown as trace (ii) of FIG. 6B, at the appropriate points of the dispersed beam. Since the light makes two traverses of the neutral density filter 215, the same consideration as mentioned above in connection with the LC sub-pixels 115 (FIG. 4) must be taken into account in calculating the compensating effect of the neutral density filter 215.

The ND filter described above has a transmission which varies spatially along its length. Consequently, when placed at or near the focal plane of the WSS focusing optic, it will act as a spectral filter since there is a direct relation between the spatial position and the wavelength.

According to another alternative implementation, in order to compensate for the insertion loss notches occurring at different wavelengths at the MEMS gaps, it is possible to use a filter having a real spectrally varying characteristic, such as a Gain Flattening Filter (GFF), whose spectral characteristic is suitably tailored to perform compensation at those different wavelengths. Since such a filter operates by providing wavelength dependent modulation of the traversing light, and does not have to be associated with the spatial distribution of wavelengths occurring at the switching assembly, such a GFF element can be disposed anywhere in the optical path through the WSS, up to the dispersion grating, and even at the fiber level. It can thus be positioned at the inlet or outlet ports, either in the input or output fibers or at the exits of the fiber collimators, or after the polarization diversity element, and up to the grating. After the grating, because of the spatial dispersion of the wavelength components, such a spectral filter will need to be specially designed to operate at a predetermined location, and is thus impractical.

Figure 6C:
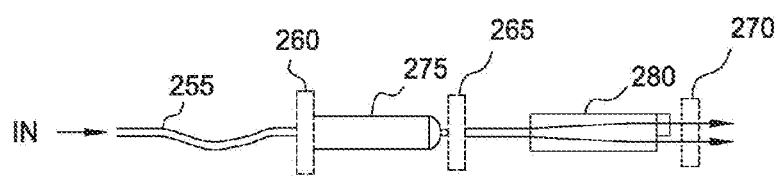
FIG. 6C shows the positioning of a spectral filter at the fiber level.

Reference is now made to FIG. 6C which illustrates schematically how a spectral filter could be placed immediately at the input to the WSS which may be similar to the WSS structure shown in FIG. 1. In the exemplary input schematic drawing of the WSS, the signal enters by a fiber 255, into a fiber collimator 275 and, for instance, on to a polarization diversity generator 280. A spectral compensation filter 260 could be positioned in the fiber input itself, or a spectral compensation filter 265 could be positioned at the output of the fiber collimator 275, or a spectral compensation filter 270 could be positioned following the polarization diversity element 280. In these locations, the beam size is small, such that the spectral filter can be accordingly small.

Figure 6D:
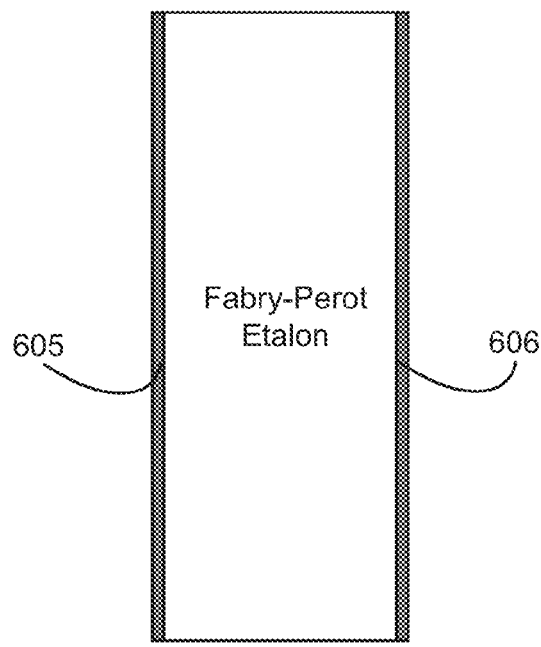
FIG. 6D illustrates a Fabry-Perot etalon.
Figure 6E:
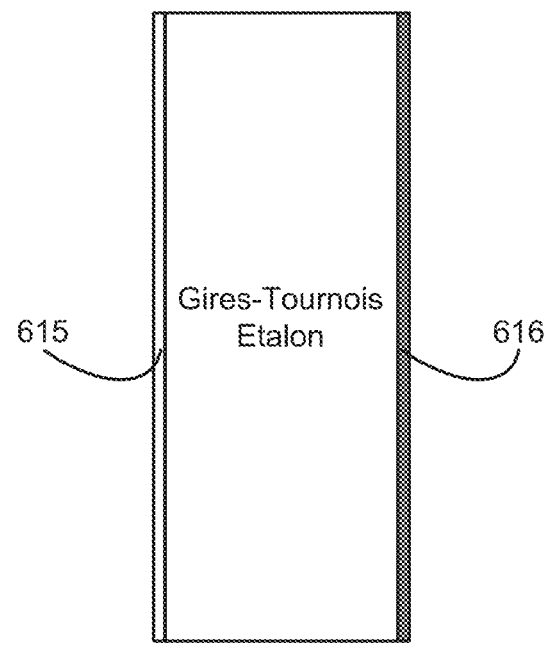
FIG. 6E illustrates a Gires-Tournois etalon.

One possible implementation of such a spectral filter could be achieved by use of an etalon, or a series of etalons. The etalon could be a Fabry-Perot or a Gires-Tournois type, or any other type giving the required spectral characteristic. As shown in FIG. 6D, a typical Fabry-Perot etalon has two highly reflective surfaces (605 and 606). A typical Gires-Tournois etalon is shown in FIG. 6E, which has a partially reflective surface 615 and a highly reflective surface 616. Much like the grid selection etalons used in the system laser sources, the etalon may be constructed so that it is tuned to provide transmission peaks at exactly the wavelength spacing corresponding to the dispersed wavelengths falling on the gaps of the MEMS array. By this means, the increased insertion loss at the gaps is compensated for by the increased transmission effects at the etalon transmission peaks.

The form of the spectral transmission of such a filter should be similar to that shown in FIG. 6B, but with wavelength as the abscissa of the plot, instead of spatial position.

Figure 7:
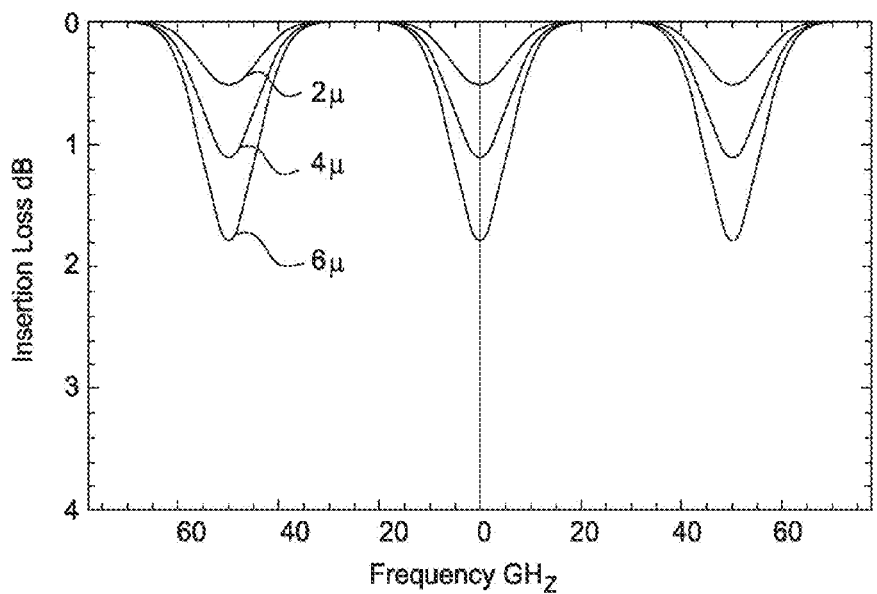
FIG. 7 is a theoretical plot of the spectral insertion loss incurred by a Gaussian beam falling on a pixelated array of MEMS, such as that shown in FIG. 2A.

A further method for compensating for the inter-pixel gaps depends on the generation of an additional loss process in the MEMS array. In order to understand this method, it was necessary to use the calculated interrelations between gap width, MEMS pixel pitch, and the width of the incident beam on the MEMS array. Reference is therefore now made to FIG. 7, which is a theoretical plot of the insertion loss incurred by a Gaussian beam falling on such a pixelated array of MEMS, as a function of the frequency of the optical signal falling on the array plane, which is translatable into the spatial position along the array.

The plot in FIG. 7 shows the theoretical results obtained for a Gaussian beam of width $40\mu$ a pitch between MEMS pixels of $120\mu$, a 50 GHz grid, and for gap sizes of $2\mu$, $4\mu$ and $6\mu$. The plot shows two expected results: (i) the insertion loss is maximum at the gap positions, which, in the frequency frame, are positioned at the 50 GHz grid spacings, and (ii) the insertion loss increases as the gap width increases.

Figure 8:
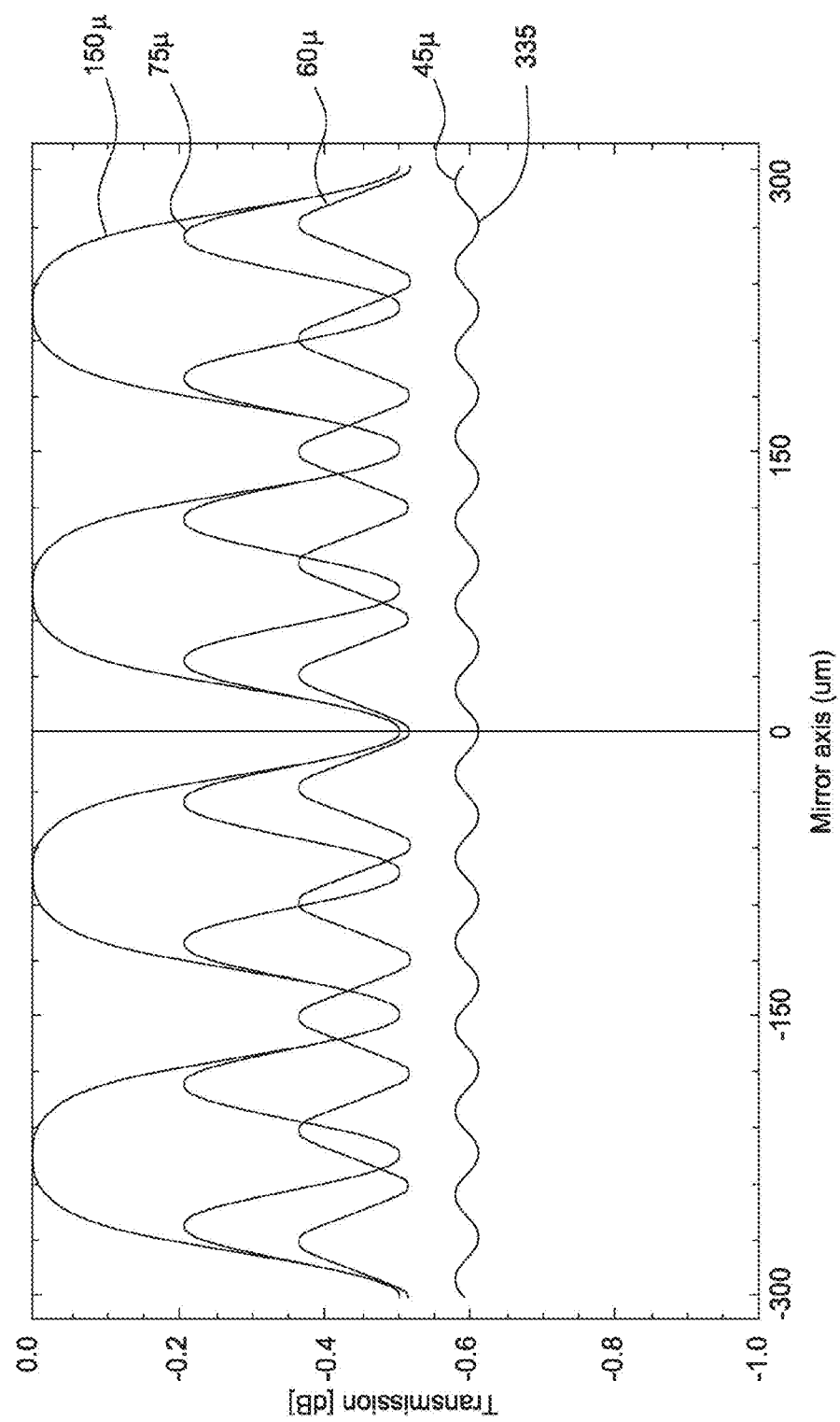
FIG. 8 shows the reflection of a Gaussian beam on a mirror having an array of slots.

Reference is now made to FIG. 8, which shows the result of using the above described theoretical calculation to determine the reflection of a Gaussian beam on a mirror having an array of slots, or the converse—the transmission of a Gaussian beam through a window with an array of opaque bars. In this simulation all of the slots are $3\mu$ wide, the Gaussian mode width is $60\mu$, and plots are made for slot spacings (or periods) of $150\mu$, $75\mu$, $60\mu$, and $45\mu$. The transmission plot from the mirror is shown as a function of width across the mirror. As the slot spacing decreases, it is seen that the modulation depth (peak to valley) of the transmission function decreases, and of course, the spacing between the transmission dips decreases in unison with the decreasing slot spacing. For the 45 micron slot period, although the overall insertion loss has increased to 0.6 dB, the modulation depth has decreased to about 0.05 dB.

Figure 9A:
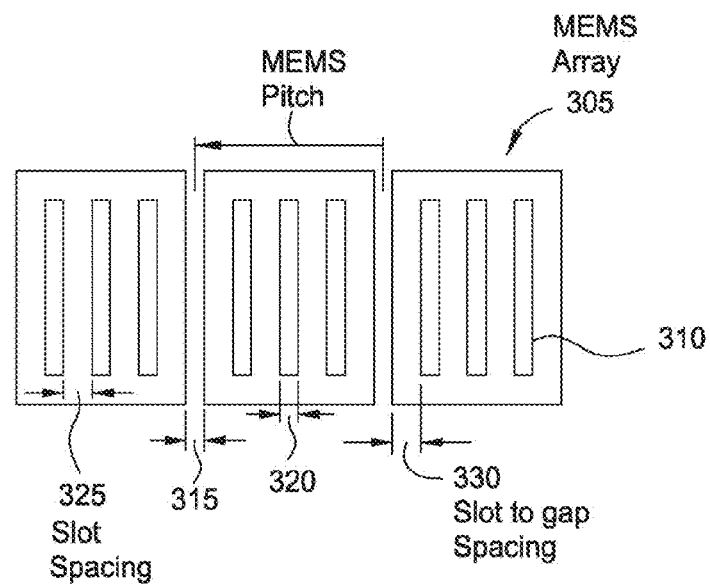
FIG. 9A illustrates schematically how the results shown in FIG. 8 can be used to reduce the effect of the inter-pixel gaps in the MEMS arrays of this disclosure.

Reference is now made to FIG. 9A, which illustrates schematically how the results shown in FIG. 8 can be used to reduce the effect of the inter-pixel gaps in the MEMS array of the WSS's described in this disclosure. In FIG. 9A there is seen a MEMS array 305 (of three mirrors only, but understood to be many more if desired) which may be used in WSS structure shown in FIG. 1. Each of the MEMS mirrors has been adapted to use this method by provision of a number of slots 310, generally aligned parallel to gaps 315 between the MEMS mirrors. The width 320 of the slots 310 are most advantageously made to be of a similar width to the gaps 315 between the MEMS mirrors, and spaced across the MEMS mirrors such that the slots 310 and the gaps 315 provide a continuum of "gaps", equally spaced from each other, at which there is no reflection from the mirror. In other words, the slot spacing 325 and the slot to gap spacing 330 are substantially equal. In this respect, the slotted mirrors and the gaps 315 between the mirrors now show reflection behavior similar to that shown in the plot of FIG. 8. Consequently, if the slot spacing 325 are selected to be sufficiently small, the effect of the gaps 315 alone will be "smeared out" as part of the overall effect of an array of slots on the mirrors. By this means, the necessary gap 315 between the MEMS mirrors is camouflaged among unnecessary "gaps", generated as slots 310 in the mirrors, for instance, by etching. The overall result, as seen for instance in the plot 335 of FIG. 8, is that by introduction of an additional loss process on the mirror surface, a significantly flatter transmission response from the mirrors is obtained, at the expense of only a slight increase in insertion loss, 0.6 dB in the example shown. If the real inter-pixel gaps are of slightly larger width than the slots in the mirror surface, as will generally be the case in the practical implementation of this method, since the gaps in the mirrors cannot readily be made as small as the slots, the uniformity of the response will be affected, with a slightly larger modulation depth, but an overall improvement in spectral response over the array will be maintained.

Figure 9B:
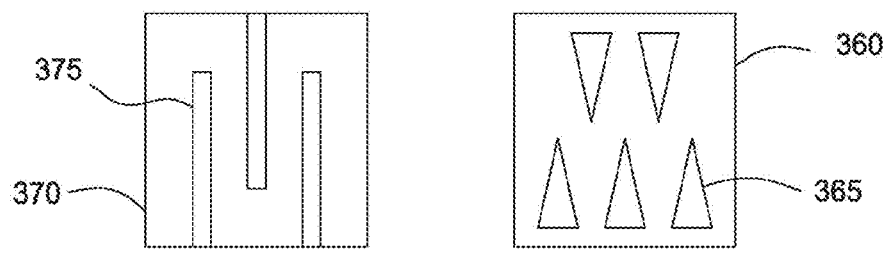
FIG. 9B shows some alternative mirror perturbance for use in the array of FIG. 9A.

Reference is now made to FIG. 9B, which illustrates some alternative methods of generating the slots on the mirrors. For example, shapes 365, such as keyhole shapes, can be formed in mirror 360. In another example, shapes 375 (e.g., slots) can be formed at different positions on mirror 370. The shapes can be selected to also generate diffraction effects.

While the foregoing is directed to embodiments of the present invention, other and further embodiments of the invention may be devised without departing from the basic scope thereof, and the scope thereof is determined by the claims that follow.

The invention claimed is:

1. An optical device comprising:
   an array of Micro Electro Mechanical System (MEMS) mirrors, successive ones of said MEMS mirrors having gaps between them, such that said MEMS array shows decreased optical throughput at positions of said gaps; and
   an optical element disposed in juxtaposition to said MEMS array, such that light impinging on said MEMS array also traverses said optical element, said optical element having a spatial transmission characteristic which shows increased transmission in at least some positions through which light impinging on said gaps passes, as compared to positions through which light impinging on said MEMS mirrors passes.

2. The optical device according to claim 1, wherein said optical element compensates for said decreased optical throughput of said MEMS array at said gap positions.

3. The optical device according to claim 1, wherein said light impinging on said MEMS array is dispersed light such that each position of said spatial transmission characteristic corresponds to a different wavelength of said dispersed light.

4. The optical device according to claim 1, wherein said optical element comprises a pixelated liquid crystal array having sub-pixels disposed in said positions through which light impinging on said gaps passes, said sub-pixels being biased such that transmission through them is higher than that through other regions of said pixelated liquid crystal array.

5. The optical device according to claim 1, wherein said optical element comprises a neutral density filter having increased transmission in said positions through which light impinging on said gaps passes.

6. The optical device according to claim 1, wherein said optical element is disposed in the region of the focal plane of the light traversing a device incorporating said MEMS mirrors.

7. An optical device comprising an array of Micro Electro Mechanical System (MEMS) mirrors, successive ones of said mirrors having gaps between them, wherein said mirrors have non-reflecting regions on them disposed such that reflecting regions of said MEMS mirrors have substantially the same optical throughput.

8. The optical device according to claim 7, wherein widths of reflecting regions are substantially the same and widths of non-reflecting regions are substantially the same.

9. The optical device according to either of claim 7, wherein said non-reflecting regions are slots formed in the MEMS mirrors which have widths substantially the same as widths of said gaps.

10. An optical device comprising:
    an array of Micro Electro Mechanical System (MEMS) mirrors receiving wavelength dispersed light from an input beam, successive ones of said MEMS mirrors having gaps between them, such that said MEMS array shows decreased optical throughput to the wavelengths of said input beam impinging on said gaps; and
    an optical element having a spectral transmission characteristic which shows increased transmission for at least one wavelength of light impinging on one of said gaps, as compared to wavelengths of light impinging on said MEMS mirrors adjacent said one of said gaps.

11. The optical device according to claim 10, wherein said optical element is disposed in such a position that it is traversed by said input beam before undergoing wavelength dispersion.

12. The optical device according to claim 11, wherein said optical element is disposed at a fiber level of input to a device incorporating said array of MEMS mirrors.

13. The optical device according to claim 10, wherein said optical element is at least one etalon.

14. The optical device according to claim 13, wherein said etalon is either of a Fabry-Perot etalon or a Gires-Tournois etalon.

15. The optical device according to claim 10, wherein said optical element is a filter that is disposed at an input or output port of an optical apparatus incorporating said optical device.

* * * * *